(12) United States Patent
Ackermann et al.

(10) Patent No.: US 10,882,960 B2
(45) Date of Patent: Jan. 5, 2021

(54) METHOD FOR THE HYDROPHOBIC IMPREGNATION OF FIRED CERAMIC MOLDED BODIES

(71) Applicant: Wacker Chemie AG, Munich (DE)

(72) Inventors: Hartmut Ackermann, Burghausen (DE); Rudolf Hager, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 308 days.

(21) Appl. No.: 15/526,685

(22) PCT Filed: Nov. 10, 2015

(86) PCT No.: PCT/EP2015/076251
§ 371 (c)(1),
(2) Date: May 12, 2017

(87) PCT Pub. No.: WO2016/078976
PCT Pub. Date: May 26, 2016

(65) Prior Publication Data
US 2017/0321015 A1 Nov. 9, 2017

(30) Foreign Application Priority Data
Nov. 21, 2014 (DE) .................. 10 2014 223 846

(51) Int. Cl.
| | | |
|---|---|---|
| C08G 77/50 | (2006.01) |
| C04B 41/84 | (2006.01) |
| C04B 41/00 | (2006.01) |
| C04B 41/49 | (2006.01) |
| C08G 77/385 | (2006.01) |
| C04B 111/00 | (2006.01) |

(52) U.S. Cl.
CPC ............ *C08G 77/50* (2013.01); *C04B 41/009* (2013.01); *C04B 41/4922* (2013.01); *C04B 41/84* (2013.01); *C08G 77/385* (2013.01); *C04B 2111/00586* (2013.01)

(58) Field of Classification Search
CPC .... C08G 77/50; C08G 77/385; C04B 41/009; C04B 41/4922; C04B 41/84; C04B 2111/00586
See application file for complete search history.

(56) References Cited

U.S. PATENT DOCUMENTS

| 4,757,106 A | 7/1988 | Mayer et al. |
| 5,661,196 A * | 8/1997 | Mayer ................ B05D 7/06 523/122 |
| 5,990,212 A | 11/1999 | Hager et al. |
| 6,268,423 B1 | 7/2001 | Mayer et al. |
| 8,907,011 B2 * | 12/2014 | Rautschek ............ C08J 3/05 524/858 |
| 2008/0188617 A1 | 8/2008 | Standke et al. |

FOREIGN PATENT DOCUMENTS

| DE | 42 41 727 A1 | 6/1994 |
| DE | 197 52 659 A1 | 6/1999 |
| DE | 10 2005 004 871 A1 | 8/2006 |
| EP | 0 242 798 B1 | 10/1987 |
| EP | 0 826 650 A1 | 8/1997 |
| EP | 0927748 A1 | 7/1999 |
| JP | 2004251100 A2 | 9/2004 |
| JP | 2005000742 A2 | 1/2005 |
| JP | 2009035704 A2 | 2/2009 |
| KR | 19990063184 A | 7/1999 |
| WO | WO-2012136589 A1 * | 10/2012 ............ C08J 3/05 |

OTHER PUBLICATIONS

Xiaowen Gua et al., "Calculation of hydrophile-lipophile balance for polyethoxylated surfactants by group contribution method", Journal of Colloid and Interface Science 298, (2006) pp. 441-450.

* cited by examiner

*Primary Examiner* — Robert S Walters, Jr.
(74) *Attorney, Agent, or Firm* — Brooks Kushman P.C.

(57) ABSTRACT

Fired clay moldings are hydrophobicized by applying a long chain alkyl-substituted alkoxysilane or hydrolysate thereof having up to 5 silicon atoms, and an alkoxy-functional silicone resin. The moldings, which may be roof tiles, are hydrophobicized to a significant depth, without discoloration.

13 Claims, No Drawings

METHOD FOR THE HYDROPHOBIC IMPREGNATION OF FIRED CERAMIC MOLDED BODIES

CROSS REFERENCE TO RELATED APPLICATIONS

This application is the U.S. National Phase of PCT Appln. No. PCT/EP2015/076251 filed Nov. 10, 2015, which claims priority to German Application No. 10 2014 223 846.3 filed Nov. 21, 2014, the disclosures of which are incorporated in their entirety by reference herein.

BACKGROUND OF THE INVENTION

1. Field of the Invention

The invention relates to a process for the hydrophobizing impregnation of fired clay moldings, in particular of roof tiles, by the use of aqueous dispersions of organosilicon compounds.

2. Description of the Related Art

Processes for the hydrophobizing impregnation of mineral construction materials have a long history. Reference may be made in this connection by way of example to EP-B1 242 798. Organosilicon compounds are used for protection of buildings mainly because of their excellent water- and soiling-resistant impregnation effect. Materials widely used for this application for many years are siliconates, silicone resins, monomeric silanes and oligomeric siloxanes. The active ingredients are usually dissolved or dispersed in low-viscosity carriers, e.g. water. However, conventional hydrophobizing agents often exhibit insufficient effectiveness on a wide variety of roof tiles, in particular on engobed and high-alkali-content roof tiles, and lead to undesired local discoloration.

SUMMARY OF THE INVENTION

The invention provides a process for the hydrophobizing impegnation of fired clay moldings by applying an aqueous dispersion of a alkoxysilane having at least one silicon-bonded $C_{6-22}$ alkyl group or partial hydroxysate thereof having no more than 5 silicon atoms, and a siloxane containing at least 10 siloxy units.

DETAILED DESCRIPTION OF THE PREFERRED EMBODIMENTS

The invention thus provides a process for the hydrophobizing impregnation of fired clay moldings via treatment of the fired clay moldings with aqueous compositions comprising (A) Silanes of the formula

in which

R denotes monovalent, SiC-bonded hydrocarbon moieties having from 1 to 5 carbon atoms, $R^1$ denotes monovalent, SiC-bonded hydrocarbon moieties having from 6 to 22 carbon atoms, $R^2$ can be identical or different and denotes a hydrogen atom or a monovalent hydrocarbon moiety and a is 0 or 1, and/or partial hydrolysates of these having at most 5 silicon atoms, (B) Siloxanes comprising at least 10 units of the formula

where $R^3$ can be identical or different and denotes a monovalent, SiC-bonded, nitrogen-containing hydrocarbon moiety, $R^4$ can be identical or different and denotes a monovalent, SiC-bonded, hydrocarbon moiety that is unsubstituted or that optionally has halogen atoms as substituents, $R^5$ can be identical or different and denotes hydrogen atom or monovalent hydrocarbon moieties, b is 0, 1, 2 or 3, c is 0, 1, 2 or 3 and d is 0, 1, 2 or 3, with the provision that $b+c+d \leq 3$, optionally (C) acid, optionally (D) emulsifier, (E) water and optionally (F) other substances.

Examples of moieties R are alkyl moieties such as the methyl, ethyl, n-propyl, isopropyl, 1-n-butyl, 2-n-butyl, isobutyl and tert-butyl moieties, and alkenyl moieties such as the vinyl, 1-propenyl and 2-propenyl moieties.

Alkyl moieties having from 1 to 5 carbon atoms are preferred for moiety R, particular preference being given to the methyl moiety.

Examples of moieties $R^1$ are alkyl moieties such as hexyl moieties, for example the n-hexyl moiety; heptyl moieties, for example the n-heptyl moiety; octyl moieties, for example the n-octyl moiety and isooctyl moieties such as the 2,2,4-trimethylpentyl moiety; nonyl moieties, for example the n-nonyl moiety; decyl moieties, for example the n-decyl moiety; dodecyl moieties, for example the n-dodecyl moiety; tetradecyl moieties, for example the n-tetradecyl moiety; hexadecyl moieties, for example the n-hexadecyl moiety; octadecyl moieties, for example the n-octadecyl moiety; cycloalkyl moieties, for example cyclohexyl, cycloheptyl and methylcyclohexyl moieties.

Preference is given to alkyl moieties having from 6 to 16 carbon atoms for moieties $R^1$, particular preference being given to alkyl moieties having from 8 to 12 carbon atoms, in particular, the isooctyl moiety.

For moiety $R^2$, preference is given to alkyl moieties having from 1 to 4 carbon atoms, particular preference being given to the methyl or ethyl moiety.

Examples of silane (A) in the composition used in the invention are hexyltriethoxysilane, hexylmethyldiethoxysilane, n-octyl-trimethoxysilane, n-octyltriethoxysilane, n-octyltributoxysilane, isooctyltrimethoxysilane, isooctyltriethoxysilane, n-decyltriethoxysilane, dodecylmethyldimethoxysilane, tetradecyltrimethoxysilane, hexadecyltrimethoxysilane, octadecylmethyldimethoxysilane, octadecylmethyldiethoxysilane and octadecyltriethoxysilane.

Preference is given to the following for silane (A): n-hexyltriethoxysilane, n-octyltriethoxysilane or isooctyltriethoxysilane and/or partial hydrolysates of this having at most 5 Si atoms, particular preference being given to isooctyltriethoxysilane and/or partial hydrolysates of these, where an isooctyltriethoxysilane isomer to which preference is given in particular is 2,2,4-trimethylpentyltriethoxysilane.

Partial hydrolysates are mostly produced in that some of the $OR^2$ moieties in the silanes of the formula (I) have been cleaved via reaction with water or water vapor, and silicon-bonded OH groups are produced. These can in turn condense with elimination of water to give siloxane bonds, thus producing oligomers which can also comprise OH groups alongside $OR^2$ groups. Partial hydrolysates of silanes of the formula (I) can also be present as an impurity in the silane of the formula (I).

Examples of moieties $R^3$ are moieties of the formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C^7H_{15}NH(CH_2)_3$—, $H_2N(CH_2)_4$—, $H_2N$—$CH_2$—$CH(CH_3)$—$CH_2$—, $H_2N(CH_2)_5$—, cyclo-$C_5H_9NH(CH_2)_3$—, cyclo-$C_6H_{11}NH(CH_2)_3$—, phenyl-NH $(CH_2)_3$—, $(CH_3)_2N(CH_2)_3$—, $(C_2H_5)_2N(CH_2)_3$—, $(C_3H_7)_2N(CH_2)_3$—, $(C_4H_9)_2N(CH_2)_3$—, $(C_5H_{11})_2N(CH_2)_3$—, $(C_6H_{13})_2N(CH_2)_3$—, $(C_7H_{15})_2N(CH_2)_3$—, $H_2N(CH_2)$—, $H_2N(CH_2)_2NH(CH_2)$—, $H_2N(CH_2)_2NH(CH_2)_2NH(CH_2)$—, $CH_3NH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-NH$(CH_2)$—, $(CH_3)_2N(CH_2)$—, $(C_2H_5)_2N(CH_2)$—, $(C_3H_7)_2N(CH_2)$—, $(C_4H_9)_2N(CH_2)$—, $(C_5H_{11})_2N(CH_2)$—, $(C_6H_{13})_2N(CH_2)$—, $(C_7H_{15})_2N(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$— and $(C_2H_5O)_2(CH_3)Si(CH_2)_3NH(CH_2)_3$—, and also reaction products of the abovementioned primary amino groups with compounds comprising double bonds reactive toward primary amino groups or comprising epoxy groups.

Moiety $R^3$ is preferably the $H_2N(CH_2)_3$—, $H_2N(CH_2)_2NH(CH_2)_3$— or cyclo-$C_6H_{11}NH(CH_2)_3$ moiety, in particular the $H_2N(CH_2)_2NH(CH_2)_3$ moiety.

Examples of moieties $R^4$ are alkyl moieties such as the methyl, ethyl, n-propyl, isopropyl, 1-n-butyl, 2-n-butyl, isobutyl, tert-butyl, n-pentyl, isopentyl, neopentyl and tert-pentyl moieties; hexyl moieties, for example the n-hexyl moiety; heptyl moieties, for example the n-heptyl moiety; octyl moieties such as the n-octyl moiety and isooctyl moieties such as the 2,2,4-trimethylpentyl moiety; nonyl moieties, for example the n-nonyl moiety; decyl moieties, for example the n-decyl moiety; dodecyl moieties, for example the n-dodecyl moiety; tetradecyl moieties, for example the n-tetradecyl moiety, hexadecyl moieties, for example the n-hexadecyl moiety, octadecyl moieties, for example the n-octadecyl moiety; cycloalkyl moieties, for example the cyclopentyl, cyclohexyl, cycloheptyl and methylcyclohexyl moieties; alkenyl moieties, for example the vinyl, 1-propenyl and 2-propenyl moieties; aryl moieties, for example the phenyl, naphthyl, anthryl and phenanthryl moieties; alkaryl moieties, for example the o-, m-, p-tolyl moieties, xylyl moieties and ethylphenyl moieties; and aralkyl moieties, for example the benzyl moiety and the α- and β-phenylethyl moieties.

Preference is given to unsubstituted alkyl moieties having from 1 to 18 carbon atoms for moiety $R^4$, particular preference being given to methyl, n-hexyl, n-octyl or isooctyl moieties, in particular to the methyl moiety.

For moiety $R^5$, preference is given to alkyl moieties having from 1 to 4 carbon atoms, particular preference being given to the methyl or ethyl moieties.

The siloxanes (B) used in the invention can be any desired known linear, cyclic or branched siloxane. It is preferable that the siloxanes (B) are those composed of units of the formula (II). It is particularly preferable that siloxanes (B) are those selected from the group consisting of (B1) Silicone resins made of units of the formula (II) where b is equal to 0, where in fewer than 50% of all of the units of the formula (II) in the organopolysiloxane resin c is equal to 2, and (B2) Siloxanes made of units of the formula (II), where in at least one unit b is not 0 and in at least 50% of all of the units of the formula (II) in the organopolysiloxane b+c is equal to 2.

It is preferable that the silicone resins (B1) are silicone resins made of units of the formula (II) where in from 0 to 30%, more preferably from 0 to 5%, of the units in the resin c is equal to 2.

It is particularly preferable that component (B1) is organopolysiloxane resins composed of repeating units of the formula (II) where b=0

$$R^4{}_c(OR^5)_d SiO_{(4-c-d)/2} \qquad (II'),$$

where
the definitions of $R^4$, $R^5$, c and d are as stated above, with the proviso that
c has the value 1 in at least 30% of all of the repeating units of the formula (II') and can also have the value 1 in 100% of all of the repeating units of the formula (II'),
and the average value of c across all of the repeating units of the formula (II') is from 0.9 to 1.49, particularly preferred values of c in the repeating units of the formula (II') being c=1 and c=2,
the average value of d across all of the repeating units of the general formula (II') is from 0.1 to 1.8, where in the silicone resins (B1) made of repeating units of the formula (II') the extent to which the unit —$OR^5$ denotes hydroxy groups is at most 5% by weight.

The organopolysiloxane resins (B1) can be solid or liquid. It is preferable that the organopolysiloxane resins (B1) are liquid, with viscosity from 1000 to 400,000 mPas at 25° C. and at the pressure of the ambient atmosphere, i.e. at from 900 to 1100 hPa. The weight-average molar mass of these resins determined by gel permeation chromatography (based on a polystyrene standard) is preferably from 200 to 200,000 g/mol, in particular from 1000 to 20,000 g/mol.

The siloxanes (B2) are preferably siloxanes made of units of the formula (II) where in from 60 to 100%, preferably from 80 to 100%, of the units in the molecule b+c is equal to 2.

Preferred examples of siloxanes (B2) are products that can be produced in a known manner, for example via equilibration and/or condensation of organopolysiloxanes which comprise alkoxy groups and/or hydroxy groups and which are free of nitrogen, more preferably of hydroxy-terminated polydimethylsiloxanes, and of silanes having monovalent, SiC-bonded, nitrogen-containing hydrocarbon moieties, for example aminoalkyl groups. OH-terminated polydimethylsiloxanes preferably used here are siloxanes with molar masses $M_n$ (number average) of from 500 to 1,000,000 g/mol, more preferably from 1,000 to 100,000 g/mol, and in particular from 2,000 to 10,000 g/mol.

For the purposes of the present invention, number-average molar mass $M_n$ is determined by means of Size Exclusion Chromatography (SEC) against polystyrene standard in THF at 60° C., flow rate 1.2 ml/min and RI detection (refractive index detector) in a Styragel HR3-HR4-HR5-HR5 column set from Waters Corp. USA with injection volume 100 μl.

Preferred silanes which have monovalent, SiC-bonded, nitrogen-containing hydrocarbon moieties and which are used here are $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$, $Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_3$, $H_2N(CH_2)_2NH(CH_2)_3$—$Si(OH)_2CH_3$, $H_2N(CH_2)_2NH(CH_2)_2NH(CH_2)_3$—$Si(OCH_3)_3$, $H_2N(CH_2)_2NH(CH_2)_2NH(CH_2)_3$—$Si(OC_2H_5)_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$, cyclo-$C_6H_{11}NH(CH_2)_3$—$Si(OH)_2CH_3$, phenyl-$NH(CH_2)_3$—$Si(OCH_3)_3$, phenyl-$NH(CH_2)_3$—$Si(OC_2H_5)_3$, phenyl-$NH(CH_2)_3$—$Si(OCH_3)_2CH_3$, phenyl-$NH(CH_2)_3$—$Si(OC_2H_5)_2CH_3$, phenyl-$NH(CH_2)_3$—$Si(OH)_3$, phenyl-$NH(CH_2)_3$—$Si(OH)_2CH_3$, $HN((CH_2)_3$—$Si(OCH_3)_3)_2$, $HN((CH_2)_3$—$Si(OC_2H_5)_3)_2$, $HN((CH_2)_3$—$Si(OCH_3)_2CH_3)_2$, $HN((CH_2)_3$—$Si(OC_2H_5)_2CH_3)_2$, cyclo-$C_6H_{11}NH(CH_2)$—$Si(OCH_3)_3$, cyclo-$C_6H_{11}NH(CH_2)$—$Si(OC_2H_5)_3$, cyclo-$C_6H_{11}NH(CH_2)$—$Si(OCH_3)_2CH_3$, cyclo-$C_6H_{11}NH(CH_2)$—$Si(OC_2H_5)_2CH_3$, cyclo-$C_6H_{11}NH(CH_2)$—$Si(OH)_3$, cyclo-$C_6H_{11}NH(CH_2)$—$Si(OH)_2CH_3$, phenyl-$NH(CH_2)$—$Si(OCH_3)_3$, phenyl-$NH(CH_2)$—$Si(OC_2H_5)_3$, phenyl-$NH(CH_2)$—$Si(OCH_3)_2CH_3$, phenyl-$NH(CH_2)$—$Si(OC_2H_5)_2CH_3$, phenyl-$NH(CH_2)$—$Si(OH)_3$ or phenyl-$NH(CH_2)$—$Si(OH)_2CH_3$, preference being given here to $H_2N(CH_2)_3$—$Si(OCH_3)_3$, $H_2N(CH_2)_3$—$Si(OC_2H_5)_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OC_2H_5)_3$ and cyclo-$C_6H_{11}NH(CH_2)_3$—$Si(OCH_3)_2CH_3$, and particular preference being given here to $H_2N(CH_2)_2NH(CH_2)_3$—$Si(OCH_3)_3$, $H_2N(CH_2)_2NH(CH_2)_3$—$Si(OC_2H_5)_3$ or $H_2N(CH_2)_2NH(CH_2)_3$—$Si(OCH_3)_2CH_3$.

The viscosity of the siloxanes (B2) at 25° C. is preferably from 10 to 10,000 mm$^2$/s, more preferably from 15 to 500 mm$^2$/s.

The nitrogen content of the siloxanes (B2) is preferably from 0.5 to 10% by weight, more preferably from 1 to 6% by weight.

For the purposes of the present invention, the viscosity of liquids that are not pastes is determined at 25° C. by using an AVS viscometer from Schott (Ubbelohde viscometer; a detailed description of the viscosity measurement is found in DIN 51562, Part 1).

It is most preferable that the siloxanes (B2) are siloxanes composed of at least 60% by weight of dimethylsiloxane units and have at least one siloxane unit which has a Si-bonded aminoethylaminopropyl group, which can be either at the end of a chain or pendant.

It is preferable that component (B) of the composition used in the invention is siloxane (B2).

Quantities of component (B) present in the compositions used in the invention are preferably from 1 to 80 parts by weight, more preferably from 5 to 40 parts by weight, based in each case on 100 parts by weight of component (A).

Examples of optionally used acid (C) are mineral acids, for example sulfuric acid, hydrochloric acid and phosphorus acids, and also organic acids, for example carboxylic acids having from 1 to 10 carbon atoms.

Preference is given to organic acids for the optionally used acid (C), particular preference being given to carboxylic acids having from 2 to 6 carbon atoms, in particular to acetic acid or propionic acid.

If the compositions used in the invention comprise acids (C), the quantities are preferably from 0.2 to 20 parts by weight, more preferably from 1 to 10 parts by weight, based in each case on 100 parts by weight of component (A).

Acid (C) is preferably used when siloxanes (B2) are used as component (B) in the compositions used in the invention.

Emulsifiers (D) can be any of the emulsifiers that are useful for the production of siloxane dispersions. Emulsifiers (D) can be anionic, nonionic, cationic and amphoteric surfactants or a mixture of these. It is alternatively also possible to use polymeric compounds that have emulsifying properties, for example polyvinyl alcohols, in particular polyvinyl alcohols with a degree of hydrolysis that is from 75% to 95%.

Preference is given to nonionic emulsifiers, or mixtures of nonionic emulsifiers and ionic emulsifiers, for the optionally used component (D).

Examples of the nonionic emulsifiers (D) used in the invention are sorbitan fatty acid esters, ethoxylated sorbitan fatty acid esters, ethoxylated fatty acids, ethoxylated linear or branched alcohols having from 10 to 20 carbon atoms, ethoxylated alkylphenols, pentaerythritol fatty acid esters, glycerol esters and alkylpolyglycosides.

It is preferable that the nonionic emulsifiers (D) are sorbitan fatty acid esters, ethoxylated sorbitan fatty acid esters, ethoxylated fatty acids, ethoxylated linear or branched alcohols having from 10 to 20 carbon atoms or ethoxylated triglycerides.

It is preferable that the compositions used in the invention comprise no ethoxylated alkylphenols, because it is known that these are not environmentally friendly.

If nonionic emulsifiers are used as component (D), it is possible to use only one type of nonionic emulsifier or to use a mixture of a plurality of nonionic emulsifiers. The HLB value of at least one nonionic emulsifier (D) is preferably greater than or equal to 12, in particular greater than or equal to 14.

It is preferable to use, as component (D), mixtures of nonionic emulsifiers of which at least one emulsifier has an HLB value greater than or equal to 12. The proportion of emulsifiers (D) with HLB value greater than or equal to 12 in the emulsifier mixture (D) here is preferably at least 30% by weight.

The HLB value indicates the balance between hydrophilic and hydrophobic groups in an emulsifier. The definition of the HLB value is well known, as also are methods for its determination, and these are described by way of example in Journal of Colloid and Interface Science 298 (2006) 441-450, and also in the literature cited therein.

Examples of anionic emulsifiers (D) that can be used are alkylsulfonates, alkylsulfates and alkylphosphates.

Examples of cationic emulsifiers (D) are all of the known quaternary ammonium compounds which bear at least one substituted or unsubstituted hydrocarbon moiety having at least 10 carbon atoms, for example dodecyldimethylammonium chloride, tetradecyltrimethylammonium bromide, stearyltrimethylammonium chloride, distearyldimethylammonium chloride, cetyltrimethylammonium chloride, behenyltrimethylammonium bromide, dedecyl-benzyldimethylammonium chloride and benzyltrimethylammonium chloride.

If cationic emulsifiers are used as component (D), preference is given to aryl- or alkyltrimethylammonium salts such as stearyltrimethylammonium chloride or cetyltrimethylammonium chloride, in particular benzyltrialkylammonium salts, in particular trimethylbenzylammium chloride or trimethylbenzylammoniummethosulfate.

Other examples are all of the known quaternary imidazolinium compounds that bear at least one substituted or unsubstituted hydrocarbon moiety having at least 10 carbon atoms, for example 1-methyl-2-stearyl-3-stearylamidoethyl-imidazolinium methosulfate, 1-methyl-2-norstearyl-3-stearylamido-ethylimidazolinium methosulfate, 1-methyl-2-oleyl-3-oleylami-doethylimidazolinum methosulfate, 1-methyl-2-stearyl-3-methylimidazolinum methosulfate, 1-methyl-2-behenyl-3-methylimidazolinum methosulfate and 1-methyl-2-dodecyl-3-methylimidazolinum methosulfate.

If component (D) is used for the production of the compositions used in the invention, the quantities are preferably from 0.1 to 15 parts by weight, more preferably from 0.3 to 8 parts by weight, based in each case on 100 parts by weight of component (A).

Emulsifier (D) is preferably used when silicone resins (B1) are used as component (B) in the compositions of the invention. It is preferable to omit the use of emulsifier (D) when siloxanes (B2) are used as component (B) in the compositions of the invention.

The water used as component (E) can be any desired type of water, for example naturally occurring water, e.g. rainwater, groundwater, spring water, river water and seawater, chemically treated water, e.g. demineralized water, distilled water or (repeatedly) redistilled water, drinking water or mineral water.

Quantities of component (E) present in the compositions used in the invention are preferably from 50 to 99.99% by weight, more preferably from 80 to 99.9% by weight, based in each case on the entirety of the composition. Preference is in particular given in the process of the invention to highly dilute compositions with from 92 to 99.9% by weight content of water (E).

The other components (F) optionally used in the invention can be any of the additional substances useful in aqueous dispersions, e.g. thickeners, organosilicon compounds differing from components (A) and (B), substances for adjusting pH, fragrances, dyes, pigments such as iron oxide, alcohols, antifreezes, for example glycols and glycol ethers, and preservatives.

Examples of optional thickeners (F) are polyacrylic acid, polyacrylates, cellulose ethers such as carboxymethylcellulose and hydroxyethylcellulose, natural gums such as xanthan gum, and polyurethanes.

Examples of optional organosilicon compounds (F) are tetraethoxysilane, trimethylmethoxysilane, aminopropyltriethoxysilane and aminopropylmethyldimethoxysilane.

Examples of optional substances for adjusting pH (F), alongside aminosilanes, are amines, e.g. monoethanolamine, or alkali metal hydroxides. Buffer systems can also be used if it is necessary to ensure that pH is constant over a prolonged period, examples being salts of acetic acid, salts of phosphoric acid, and salts of citric acid, in each case in combination with the free acid, as required by the desired pH.

In a preferred embodiment, the composition of the invention comprises ethanol and/or methanol as component (F) in quantities that are preferably from 0.00001 to 1% by weight, more preferably from 0.0001 to 0.5% by weight. The alcohol quantities mentioned are mostly formed during the production of the composition used in the invention and/or during storage thereof.

In a particularly preferred embodiment, the composition of the invention comprises no component (F) other than alcohols.

The compositions used in the invention are preferably those comprising
(A) Silanes of the formula (I),
(B1) Silicone resins made of units of the formula (II) where b is equal to 0, where in fewer than 50% of all of the units of the formula (II) in the organopolysiloxane resin c is equal to 2,
(D) emulsifier,
(E) water and
optionally (F) other substances.

In another preferred embodiment of the present invention, the compositions used are those comprising
(A) Silanes of the formula (I),
(B2) Siloxanes made of units of the formula (II), where in at least one unit b is not 0 and in at least 50% of all of the units of the formula (II) in the organopolysiloxane b+c is equal to 2,
(C) acids,
(E) water and
optionally (F) other substances.

It is preferable that the compositions used in the invention comprise no components other than the components (A) to (F), and also reaction products of these.

The components used in the invention can in each case be one type of that component or else a mixture of at least two types of a respective component.

The compositions used in the invention are preferably dispersions, for example emulsions and suspensions, most preferably emulsions.

The aqueous compositions used in the invention can be produced by processes known per se. The usual production process is simple mixing of all of the constituents in any sequence at temperatures that are preferably from 1 to 50° C., and optionally subsequent homogenization.

In a preferred embodiment of the process of the invention, the compositions are those that are produced by, in a first step, homogeneously mixing the components (A), (B), optionally (C) and optionally (D) in a suitable mixer, e.g. a flask or tank, and then heating to temperatures of from 60 to 140° C., preferably from 80 to 130° C., for from 0.5 to 4 hours, and in a second step emulsifying the mixture obtained in the first step with water (E), optionally (D) and optionally (F).

The emulsion obtained in the second step can optionally be diluted with further water, and it is also possible here to add further substances (F).

The dispersions used in the invention are preferably milky, white to beige liquids.

The solids content of the compositions used in the invention, i.e. content of nonvolatile compounds (e.g. determined in accordance with ASTM D-5095) is preferably from 0.006 to 40% by weight, more preferably from 0.06 to 18% by weight.

The viscosity of compositions used in the invention is preferably from 0.5 to 10 000 mm$^2$/s, and in particular from 1 to 1,000 mm$^2$/s, in each case measured at 25° C. in accordance with the abovementioned test method.

For the purposes of the present invention, the expression "fired clay moldings" means any of the moldings that can be obtained via firing of clay-containing materials at temperatures above 500° C. and at the pressure of the ambient atmosphere, i.e. at from 900 to 1100 hPa, where the clay-containing materials can comprise, alongside clay, other constituents, for example sand and aggregates.

It is preferable that the fired clay moldings used in the invention are industrial clay-based ceramic materials, particularly roof tiles, facade bricks/tiles, facade elements, other tiles, or vessels, particularly roof tiles or facade tiles.

The fired clay moldings used in the invention can be uncoated or coated, e.g. with an engobe.

In particular, the fired clay moldings used in the invention are engobed roof tiles.

Engobe has a long history and in this context is intended to be a generic term for a low-viscosity liquid clay-mineral composition that serves for the coloring or coating of ceramic products. By way of example, this material can be slip; engobes are unlike glazes in that they do not form a protective layer for the ceramic product.

In the treatment of the invention, the fired clay moldings are brought into contact with the aqueous composition, whereupon the composition penetrates partially or completely into the moldings.

In the process of the invention, the compositions are applied to the surface of the moldings by familiar distribution methods known hitherto, e.g. via spreading, spraying, doctoring, roller methods, casting, troweling, immersion or rolling.

In the process of the invention, the compositions generally penetrate into the capillaries of the moldings and undergo drying therein.

The water absorption of the moldings is dramatically reduced by the hydrophobizing of the invention; this reduces thermal conductivity, and also prevents destruction of the construction materials through the effect of frost and condensation cycles, or salt.

The quantity of the aqueous composition used in the process of the invention is such that the entire quantity of components (A), (B) and optionally (C), and also any reaction products of these per $m^2$ of fired-clay-body area to be treated is preferably from 0.01 to 7.00 g, more preferably from 0.03 to 3.00 g.

The process of the invention is carried out at temperatures which are preferably in the range from 0 to 100° C., more preferably in the range from 10 to 90° C.

The process of the invention is preferably carried out at ambient pressure, i.e. at from 900 to 1100 hPa.

The process of the invention is carried out either immediately after the firing of the clay moldings or at any desired juncture after the production of the clay moldings. Surprisingly, it is also possible to carry out the hydrophobizing impregnation of the invention on fired clay moldings that have already been subject to some extent of ageing.

In the process of the invention, the treated, fired clay moldings are preferably stored under conditions that permit evaporation of water and other volatile components.

The process of the invention has the advantage of being efficient and inexpensive, and of providing long lasting and durable protection of the fired clay moldings from the effect of water.

The composition used in the invention has the advantage that the components (A), (B), optionally (C) and optionally (D) can be used to produce a concentrate which is diluted with water to give the finished composition of the invention only when it is spatially and chronologically close to the intended application. This saves transport costs and storage costs. This concentrate moreover has the advantage of being very stable in storage.

The use of the aqueous compositions has the advantage that they are environmentally friendly and amenable to a wide range of dilution.

Another advantage of the process of the invention is that it impregnates fired clay moldings in a manner that is highly effective and avoids undesired location discoloration.

The aqueous compositions used in the invention have the advantage that they can be produced at low cost and are easy to handle.

The process of the invention has the advantage that the aqueous compositions exhibit a very good and robust hydrophobizing impregnation effect and very good penetration performance on the fired clay moldings.

All data relating to parts and percentages in the examples below are based on weight unless otherwise stated. Unless otherwise stated, the examples below are carried out at the pressure of the ambient atmosphere, i.e. at about 1000 hPa, and at room temperature, i.e. about 20° C., or at a temperature which prevails when the reactants are combined at room temperature without additional heating or cooling.

Synthesis Example 1

150 g of N-(2-aminoethyl)-3-aminopropyltrimethoxysilane are added, with stirring, to a mixture of 0.2 g of potassium hydroxide in 4.0 g of methanol and 500 g of an OH-terminated polydimethylsiloxane with average molar mass $M_n$ about 4000 g/mol in a 1-liter 3-necked flask equipped with stirrer, dropping funnel and reflux condenser, and the resultant mixture is heated to boiling point with reflux for 6 h. It is then cooled to 30° C. and mixed with 2.5 ml of 10% hydrochloric acid. Finally, the methanol is removed by distillation by heating to 140° C., and the resultant organopolysiloxane is freed from potassium chloride by filtration. The viscosity of the resultant organopolysiloxane, which comprises 2.9% weight of nitrogen, is 50 $mm^2/s$ at 25° C.

Inventive Example 1

15.4 g of the product from synthesis example 1, 80.8 g of 2,4,4-trimethylpentyltriethoxysilane (isooctyltriethoxysilane) and 3.8 g of propionic acid are mixed at room temperature and stirred at reflux at 120° C. for 2 hours.

Emulsions are then produced from the resultant premixture, in that the premixture is incorporated into water by manual stirring with a spatula. The resultant emulsions are suitable for use as hydrophobizing agents for at least 30 days. If the emulsion has creamed, it requires brief remixing prior to use.

Aqueous emulsions with the following contents of the above premixture are produced: 1.50% by weight (emulsion E1), 1.25% by weight (emulsion E2), 1.00% by weight (emulsion E3), 0.75% by weight (emulsion E4) and 0.50% by weight (emulsion E5).

In order to determine hydrophobizing effect, two black-engobed UNIVERSO 14 roof tiles from Koramic GmbH D-94315 Straubing were immersed for 60 seconds in each case in one of the emulsions produced above, which were remixed shortly prior to application. The tiles are then allowed to dry for three weeks at room temperature and 50% humidity, and their weight is determined.

The resultant roof tiles are then immersed for seven days in water of depth 10 cm, and water absorption is determined by way of the increase in weight at regular intervals. The results obtained in each of the two roof tiles after treatment with an identical emulsion are averaged.

In order to determine the penetration depth of the hydrophobizing agent on the engobed side of the roof tile, the tiles are oven-dried at 50° C. for 24 h after the determination of water absorption, and are then broken. Water is then applied to the broken edge. No water penetrates into the broken edge here in the region of the hydrophobized surface layer.

Dark discoloration of the roof tile occurs where the water penetrates, whereas the hydrophobized layer in the vicinity of the surface retains its color. It is thus possible to determine the thickness of this layer by simple measurement. The results obtained in each of the two roof tiles after treatment with an identical emulsion are averaged. The thickness of the hydrophobized layer here provides an important measure of its durability.

Undesired local discoloration on the surface is evaluated by visual assessment.

Table 1 shows the results.

TABLE 1

| Emulsion | Water absorption [%] | Penetration depth [mm] | Surface alteration |
|---|---|---|---|
| E1 (1.50%) | 1.28 | 6 | none |
| E2 (1.25%) | 1.19 | 6 | none |
| E3 (1.00%) | 1.02 | 6 | none |
| E4 (0.75%) | 0.98 | 7 | none |
| E5 (0.50%) | 1.04 | 7 | none |
| Untreated | 7.91 | — | — |

Test methods used on the untreated roof tiles were the same as used for the tiles that were treated with the emulsions E1 to E5 prior to the tests.

Without exception, the appearance of the hydrophobized roof tiles is fully satisfactory.

Inventive Example 2

The mode of operation described in inventive example 1 is repeated, except that the ready-to-use diluted emulsion is stored for 30 days prior to application. Table 2 shows the results.

TABLE 2

| Emulsion | Water absorption [%] | Penetration depth[mm] | Surface alteration |
|---|---|---|---|
| E1 (1.50%) | 0.75 | 5 | none |
| E4 (0.75%) | 0.88 | 6 | none |
| Untreated | 7.84 | — | — |

Comparative Example 1 (Standard Hydrophobizing Agent)

A 54% potassium methyl siliconate solution (which can be purchased as SILRES® BS 16 from Wacker Chemie AG, Munich, Germany) is diluted by addition of water to active ingredient concentrations of 1.50% by weight, 1.00% by weight, and 0.50% by weight. The dilution here can be achieved via simple incorporation by stirring with the aid of a spatula.

Hydrophobizing effect, penetration depth and undesired local discoloration are determined as described above in inventive example 1. Here again, black-engobed UNI-VERSO 14 roof tiles from Koramic are used. Table 3 shows the results.

TABLE 3

| Dilution | Water absorption [%] | Penetration depth [mm] | Surface alteration |
|---|---|---|---|
| 1.50% | 1.95 | 2 | severe undesired local discoloration |
| 1.00% | 2.66 | 2 | severe undesired local discoloration |
| 0.50% | 7.65 | 0 | severe undesired local discoloration |
| Untreated | 7.70 | — | — |

Irrespective of active ingredient content, it was not possible to achieve fully satisfactory hydrophobization. Higher concentrations lead to modest results, and at low concentrations of 0.50% by weight there is then practically no discernible hydrophobizing effect.

Irrespective of the concentration of the hydrophobizing emulsion moreover, the treatment of the roof tiles leads to severe undesired local discoloration on the black-engobed surface.

Comparative Example 2 (Commercially Obtainable Product)

Baysilone WA is a hydrophobizing emulsion from Momentive Performance Materials (USA, Columbus, Ohio 43215) which is recommended for hydrophobizing bricks and roof tiles.

The active ingredient content of the commercially obtainable emulsion is 60% by weight. This is diluted by addition of water to active ingredient concentrations of 1.50% by weight, 1.25% by weight, 1.00% by weight, 0.75% by weight and 0.50% by weight. The dilution here can be achieved via simple incorporation by stirring with the aid of a spatula.

Hydrophobizing effect, penetration depth and undesired local discoloration are determined as described above in inventive example 1. Here again, black-engobed UNI-VERSO 14 roof tiles from Koramic are used. Table 4 shows the results.

TABLE 4

| Dilution | Water absorption [%] | Penetration depth [mm] | Surface alteration |
|---|---|---|---|
| 1.50% | 1.14 | 8 | severe undesired local discoloration |
| 1.25% | 2.51 | 3 | severe undesired local discoloration |
| 1.00% | 2.44 | 4 | severe undesired local discoloration |
| 0.75% | 2.18 | 1 | severe undesired local discoloration |
| 0.50% | 7.54 | 0 | severe undesired local discoloration |
| Untreated | 7.85 | — | — |

Good hydrophobization was obtained only when the roof tiles were treated with emulsions with comparatively high active ingredient contents of 1.50% by weight. Moderate concentrations lead to modest results, and at concentrations below 0.75% by weight there is then practically no discernible hydrophobizing effect.

Irrespective of the concentration of the hydrophobizing emulsion moreover, the treatment of the roof tiles leads to severe undesired local discoloration on the engobed surface.

What is claimed is:

1. A process for the hydrophobizing impregnation of fired clay moldings, comprising treating the fired clay moldings with an aqueous composition comprising:
   (A) at least one silane of the formula

   $$R_aR^1Si(OR^2)_{3-a} \quad (I),$$

in which
   R each independently, are monovalent, SiC-bonded hydrocarbon moieties having from 1 to 5 carbon atoms,
   $R^1$ each independently, are monovalent, SiC-bonded hydrocarbon moieties having from 6 to 22 carbon atoms,
   $R^2$ each independently, are hydrogen or monovalent hydrocarbon moieties and a is 0 or 1,
   and/or partial hydrolysates of the silanes of formula (I) which have at most 5 silicon atoms in the partial hydrolysate,
   (B) at least one siloxane (B2) comprising at least 10 siloxy units of the formula

   $$R^3{}_bR^4{}_c(OR^5)_dSiO_{(4-b-c-d)/2} \quad (II),$$

where
   $R^3$ each independently, are monovalent, SiC-bonded, nitrogen-containing hydrocarbon moieties,
   $R^4$ each independently, are monovalent, SiC-bonded hydrocarbon moieties which are unsubstituted or have halogen atoms as substituents,
   $R^5$ each independently, are hydrogen or a monovalent hydrocarbon moieties,
   b is 0, 1, 2 or 3,
   c is 0, 1, 2 or 3 and
   d is 0, 1, 2 or 3,
   with the provisos that b+c+d≤3, that in at least one unit b is not 0, and in at least 50% of all of the units of the formula (II) in the siloxane (B2) b+c is equal to 2,
   (C) acid,
   (D) optionally, emulsifier(s),
   (E) water, and
   (F) optionally, other substances,
   wherein the aqueous composition is produced by, in a first step, homogeneously mixing the components (A), (B2), (C) and optionally (D) in a mixer and then heating to a temperature of from 60 to 140° C. for from 0.5 to 4 hours, and in a second step emulsifying the mixture obtained in the first step with water (E), optionally (D) and optionally (F).

2. The process of claim 1, wherein silane (A) comprises n-hexyltriethoxysilane, n-octyltriethoxysilane or isooctyltriethoxysilane and/or partial hydrolysates of these having at most 5 Si atoms, or mixtures thereof.

3. The process of claim 1, wherein the fired clay moldings are roof tiles, facade bricks/tiles, facade elements, other tiles, or vessels.

4. The process of claim 1, wherein the amount of the aqueous composition employed is such that the entire quantity of components (A), (B) and (C), and also any reaction products of these, per $m^2$ of fired clay molding area to be treated, is from 0.01 to 7.00 g.

5. The process of claim 1, wherein treating is carried out at temperatures in the range from 0 to 100° C.

6. The process of claim 1, wherein in siloxane (B2), the sum of b+c is equal to 2 in from 60 to 100% of units in the siloxane (B2).

7. The process of claim 1, wherein in siloxane (B2), the sum of b+c is equal to 2 in from 80 to 100% of units in the siloxane (B2).

8. The process of claim 1, wherein in siloxane (B2), the nitrogen-containing moieties $R^3$ comprise amino groups.

9. The process of claim 1, wherein the aqueous composition is emulsifyable without use of an emulsifier.

10. A process for the hydrophobizing impregnation of fired clay moldings, comprising treating the fired clay moldings with an aqueous composition comprising:
    (A) at least one silane of the formula

    $$R_aR^1Si(OR^2)_{3-a} \quad (I)$$

in which
    R each independently, are monovalent, SiC-bonded hydrocarbon moieties having from 1 to 5 carbon atoms,
    $R^1$ each independently, are monovalent, SiC-bonded hydrocarbon moieties having from 6 to 22 carbon atoms,
    $R^2$ each independently, are hydrogen or monovalent hydrocarbon moieties and a is 0 or 1,
    and/or partial hydrolysates of the silanes of formula (I) which have at most 5 silicon atoms in the partial hydrolysate,
    (B) at least one siloxane (B2) comprising at least 10 siloxy units of the formula

    $$R^3{}_bR^4{}_c(OR^5)_dSiO_{(4-b-c-d)/2} \quad (II)$$

where
    $R^3$ each independently, are monovalent, SiC-bonded, nitrogen-containing hydrocarbon moieties,
    $R^4$ each independently, are monovalent, SiC-bonded hydrocarbon moieties which are unsubstituted or have halogen atoms as substituents,
    $R^5$ each independently, are hydrogen or monovalent hydrocarbon moieties,
    b is 0, 1, 2 or 3,
    c is 0, 1, 2 or 3 and
    d is 0, 1, 2 or 3,
    with the provisos that b+c+d≤3, that in at least one unit b is not 0, and in at least 50% of all of the units of the formula (II) in the siloxane (B2) b+c is equal to 2,
    (C) acid,
    (E) water, and
    (F) optionally, other substances,
    wherein the aqueous composition is free from emulsifiers.

11. The process of claim 10, wherein component (F) is selected from the group consisting of alcohols.

12. A process for the hydrophobizing impregnation of fired clay moldings, comprising treating the fired clay moldings with an aqueous composition comprising:
    (A) at least one silane of the formula

    $$R_aR^1Si(OR^2)_{3-a} \quad (I)$$

in which
    R each independently, are monovalent, SiC-bonded hydrocarbon moieties having from 1 to 5 carbon atoms,
    $R^1$ each independently, are monovalent, SiC-bonded hydrocarbon moieties having from 6 to 22 carbon atoms, $R^2$ each independently, are hydrogen or monovalent hydrocarbon moieties and a is 0 or 1, and/or partial hydrolysates of the silanes of formula (I) which have at most 5 silicon atoms in the partial hydrolysate, (B) at least one siloxane (B2) comprising at least 10 siloxy units of the formula $$R^3{}_bR^4{}_c(OR^5)_d SiO_{(4-b-c-d)/2} \qquad (II)$$

where $R^3$ each independently, are monovalent, SiC-bonded, nitrogen-containing hydrocarbon moieties, $R^4$ each independently, are monovalent, SiC-bonded hydrocarbon moieties which are unsubstituted or have halogen atoms as substituents, $R^5$ each independently, are hydrogen or monovalent hydrocarbon moieties, b is 0, 1, 2 or 3, c is 0, 1, 2 or 3 and d is 0, 1, 2 or 3, with the provisos that b+c+d≤3, that in at least one unit b is not 0, and in at least 50% of all of the units of the formula (II) in the siloxane (B2) b+c is equal to 2, (C) acid, (D) optionally, emulsifier(s), (E) water, and (F) optionally, other substances, wherein component (F) is selected from the group consisting of thickeners, organosilicon compounds other than components (A) and (B2), substances for adjusting pH, fragrances, dyes, colored pigments, alcohols, and antifreezes, and no components other than components (A) through (F) are present.

13. A process for the hydrophobizing impregnation of fired clay moldings, comprising treating the fired clay moldings with an aqueous composition consisting essentially of:

(A) at least one silane of the formula $$R_a R^1 Si(OR^2)_{3-a} \qquad (I)$$

in which

R each independently, are monovalent, SiC-bonded hydrocarbon moieties having from 1 to 5 carbon atoms, $R^1$ each independently, are monovalent, SiC-bonded hydrocarbon moieties having from 6 to 22 carbon atoms, $R^2$ each independently, are hydrogen or monovalent hydrocarbon moieties and a is 0 or 1, and/or partial hydrolysates of the silanes of formula (I) which have at most 5 silicon atoms in the partial hydrolysate, (B) at least one siloxane (B2) comprising at least 10 siloxy units of the formula $$R^3{}_bR^4{}_c(OR^5)_d SiO_{(4-b-c-d)/2} \qquad (II)$$

where $R^3$ each independently, are monovalent, SiC-bonded, nitrogen-containing hydrocarbon moieties, $R^4$ each independently, are monovalent, SiC-bonded hydrocarbon moieties which are unsubstituted or have halogen atoms as substituents, $R^5$ each independently, are hydrogen or monovalent hydrocarbon moieties, b is 0, 1, 2 or 3, c is 0, 1, 2 or 3 and d is 0, 1, 2 or 3, with the provisos that b+c+d≤3, that in at least one unit b is not 0, and in at least 50% of all of the units of the formula (II) in the siloxane (B2) b+c is equal to 2, (C) acid, (D) optionally, emulsifier(s), (E) water, and (F) other substances selected from the group consisting of thickeners, organosilicon compounds other than components (A) and (B2), substances for adjusting pH, fragrances, dyes, colored pigments, alcohols, and antifreezes.

\* \* \* \* \*